UNITED STATES PATENT OFFICE.

HENRI N. F. SCHAEFFER, OF LOWELL, MASSACHUSETTS.

PROCESS OF DYEING WITH ALIZARIN.

SPECIFICATION forming part of Letters Patent No. 481,591, dated August 30, 1892.

Application filed January 5, 1891. Renewed June 25, 1892. Serial No. 437,953. (No specimens.)

*To all whom it may concern:*

Be it known that I, HENRI N. F. SCHAEFFER, of Lowell, county of Middlesex, State of Massachusetts, have invented an Improvement in Methods of Dyeing with Alizarin, of which the following description is a specification.

This invention relates to dyeing and the production of colors or lakes with alizarin.

Alizarin as found in the market is principally produced artificially and is insoluble in water, and therefore dyeing or the formation of colors or lakes with alizarin has always been carried on in such a manner that the cloth or fiber to be dyed is first mordanted and then passed through the bath of insoluble alizarin, from which the dye stuff is only absorbed slowly by degress. The color or lake thus formed by the combination of the mordant and the insoluble alizarin is a practical or standard color.

Alizarin possesses acid properties and unites with bases, and when acted upon by the ordinary alkalies—as, for instance, the hydrates, carbonates, &c.—a salt is formed more or less soluble in water.

The solution of alizarin in the ordinary alkalies when brought in contact with a mordant produces a color which is practically worthless because of its inferiority to the color produced by the combination of a mordant with pure insoluble alizarin. The inferiority of the color or lake produced by the combination of a mordant and alizarin dissolved in ordinary alkalies is, in my judgment, due to the presence of the alkali in the color or lake.

This invention has for its object to produce with a soluble modification of alizarin a color or lake equal to the color or lake produced by the combination of a mordant and pure or insoluble alizarin.

By experiment I have discovered that by treatment of alizarin with a soluble borate a definite soluble compound is produced which contains the alizarin in combination with both the boracic acid and the base, and thus forms a soluble salt of a compound acid radical, and from which soluble salt the alizarin is easily separated and precipitated by contact with a mordant, a reaction which does not occur when alizarin in combination with an alkali—such as when combined with soda, as alizarate of soda—is caused to act upon a mordant.

The soluble modification or compound of alizarin referred to may, and preferably will, be obtained in the following manner, viz: The commercial alizarin, which is prepared in the form of a paste—*i. e.*, in an hydrated form— is preferably completely dried, and one part, by weight, of the dehydrated substance is thoroughly incorporated or mixed, as by trituration, with two parts, by weight, of a soluble borate, preferably common borax or sodium borate. To this mixture water, preferably heated to the boiling-point, is added, and a perfect solution of the alizarin and borate is obtained, which solution is then available for application to the fiber or fabric to be treated.

The solution of the alizarin and borate may, and preferably will be, evaporated to dryness, and the powder so produced may be put in suitable packages for transportation or storage until ready for use. The powder being perfectly soluble in cold water and immediately so in hot water, a solution for use may be readily prepared at any time.

The soluble product of the alizarin with the borate, which I believe to be the boro-alizarate of the alkali, is unstable and differs from the ordinary well-known solutions of alizarin in alkalies, which are stable, in that any subsequent combinations of the alizarin with mordants are not influenced or effected by the presence of the borates as they are by the presence of such alkalies—that is, the alizarin of the boro-alizarate retains its property of dyeing and readily unites with a mordant to produce a practical or desired color or lake equal to the color or lake produced with insoluble alizarin.

By means of the boro-alizarate or soluble alizarin referred to the ordinary processes for the production of lakes in dyeing with alizarin may be very considerably simplified and improved, for by reason of the solubility of the alizarin product in water the fiber may first be completely saturated with the coloring-matter—that is, the soluble alizarin—and the required lake or color may then be produced within the fiber by the subsequent application of the necessary mordant, thus reversing the ordinary methods of dyeing with alizarin for the production of such lakes, which essentially consists in the application of the mordanting bodies, either in whole or in part, previous to the application of the alizarin.

The colors or lakes produced by the combination of the soluble alizarin with a mordant are superior to the colors ordinarily produced from the combination of alizarin and a mordant, because the fiber or fabric, by reason of the solubility in water of the boro-alizarin compound, is thereby completely saturated with or permeated by the coloring-matter, and the lakes or colors formed by the combination of the coloring-matter with the mordant are, in consequence, fixed on and within such fiber or fabric, while at the same time there is a great economy in the quantity of the coloring-matter required to produce a certain shade or result.

Owing to the complete saturation of the fiber or fabric the colors or lakes produced possess a greater depth or solidity, and consequently greater brilliancy, than the ordinary colors or lakes produced by the present known methods of dyeing with alizarin.

By the term "alizarin" in the foregoing, I mean to include not only natural and artificial alizarin proper having the formula $C_{14}H_8O_4$, but also such similar bodies known to the chemist as "anthrapurpurin," "flavo-purpurin," "isopurpurin," &c., with their homologues and derivatives.

I prefer to render the alizarin soluble in water, as above described; but I do not desire to limit myself in this respect, as the soluble salt of the compound acid radical may be obtained in other ways. For instance, the alizarin in paste form or preferably in an anhydrous condition may have added to it boracid acid, which is thoroughly mixed or incorporated with the alizarin. A solution of alkali—that is, of potassium, sodium, or ammonium—preferably warm, is then added, and the alizarin is rendered soluble by the formation of a soluble borate of the alkali.

Instead of adding a warm solution of alkali, the latter may be cold when added and the reaction completed by heat.

The soluble modification of alizarin herein described is not herein claimed, as it forms the subject-matter of another application, Serial No. 327,107, filed by me October 15, 1889. Furthermore, the method of forming a soluble alizarin, consisting in mixing insoluble alizarin in a dry or anhydrous condition, with dry boracic acid or a soluble salt thereof and then effecting the solution of the said bodies in water, is not herein claimed, as it forms the subject-matter of another application, Serial No. 437,572, filed by me June 22, 1892.

I claim—

The herein-described method of dyeing or producing colors or lakes with alizarin, which consists in first treating the cloth or fiber with a soluble modification of alizarin, consisting of a soluble salt of boracic acid and alizarin and then with a mordant, substantially as described.

In testimony whereof I have signed my name to this specification in the presence of two subscribing witnesses.

HENRI N. F. SCHAEFFER.

Witnesses:
CHAS. H. MCINTIRE,
CLARENCE L. KIMBALL.